United States Patent
Chen

(10) Patent No.: US 10,272,969 B1
(45) Date of Patent: Apr. 30, 2019

(54) ADJUSTED PEDAL

(71) Applicant: Chung-I Chen, Taichung (TW)

(72) Inventor: Chung-I Chen, Taichung (TW)

( * ) Notice: Subject to any disclaimer, the term of this patent is extended or adjusted under 35 U.S.C. 154(b) by 0 days.

(21) Appl. No.: 15/894,135

(22) Filed: Feb. 12, 2018

(51) Int. Cl.
| B62M 3/08 | (2006.01) |
| F16B 17/00 | (2006.01) |
| F16B 2/02 | (2006.01) |
| F16B 7/04 | (2006.01) |
| F16B 9/02 | (2006.01) |

(52) U.S. Cl.
CPC .............. *B62M 3/086* (2013.01); *F16B 2/02* (2013.01); *F16B 7/04* (2013.01); *F16B 9/02* (2013.01); *F16B 17/00* (2013.01)

(58) Field of Classification Search
CPC ........ B62M 3/08; B62M 3/083; B62M 3/086; F16B 2/00; F16B 2/02; F16B 7/00; F16B 7/04; F16B 9/02; F16B 9/023; F16B 9/09; F16B 17/00
See application file for complete search history.

(56) References Cited

U.S. PATENT DOCUMENTS

| 4,338,829 | A | * | 7/1982 | Ozaki | ............... B62M 3/08 |
| | | | | | 74/560 |
| 9,609,905 | B1 | * | 4/2017 | Leko | ............... B62M 3/086 |
| 2014/0251078 | A1 | * | 9/2014 | Emerson | ............... A43B 5/14 |
| | | | | | 74/594.6 |
| 2014/0259705 | A1 | * | 9/2014 | Stevovich | ............... B62M 3/08 |
| | | | | | 33/1 N |
| 2015/0053045 | A1 | * | 2/2015 | Barjesteh | ............... B62M 3/08 |
| | | | | | 74/594.4 |
| 2015/0139580 | A1 | * | 5/2015 | Lin | ............... B62M 3/003 |
| | | | | | 384/462 |
| 2015/0233520 | A1 | * | 8/2015 | Fisher | ............... H05B 3/06 |
| | | | | | 219/201 |
| 2017/0297650 | A1 | * | 10/2017 | Hermansen | ............... B62M 3/086 |

* cited by examiner

*Primary Examiner* — Prasad V Gokhale
(74) *Attorney, Agent, or Firm* — Muncy, Geissler, Olds & Lowe, P.C.

(57) ABSTRACT

An adjusted pedal is provided, including: a pedal body, having two clamp portions respectively configured to engage with a shoe; a pedal shaft, defining an axial direction; an engaging portion, disposed on the pedal body and movably engaged with the pedal shaft so that the pedal body is slidable positionly to the pedal shaft along the axial direction; wherein when the engaging portion is disengaged with the pedal shaft, the pedal body is slidable to the pedal shaft along the axial direction.

9 Claims, 9 Drawing Sheets

ADJUSTED PEDAL

BACKGROUND OF THE INVENTION

Field of the Invention

The present invention relates to an adjusted pedal.

Description of the Prior Art

A bicycle clipless pedal has a first clamp end and a second clamp end pivotably connected therewith so as to engage with a shoe cleat. Thus, foot portions of a rider can engage with the clipless pedal and avoid disengagement when riding. Compared with a pedal without a clamp structure, the clipless pedal has a high effort-saving and a high acceleration. Therefore, the clipless pedal is usually used in mountain bikes, cross-country bikes, race bikes, etc.

Foot pedal positions and pedaling manners of users will affect the pedaling efficiency in general. Everyone feet are in different sizes, shapes, and everyone has the different foot pedaling manners. Moreover, a distance between the shoe cleat and a crank will affect an effort-saving. For example, the number of turns of the pedal per minute will increase when the shoe cleat is disposed close to the crank; on the contrary, the torque will be improved. However, a conventional bicycle clipless pedal is fixed in the fixed position of a pedal shaft so that the conventional bicycle clipless pedal cannot meet the needs of different users, such as foot shapes, foot sizes, and the foot pedaling manners, to adjust the distance between the pedal and the crank to an ideal position. Of course, the industry has also developed for the bicycle clipless pedal according to the problems mentioned above in present. However, the conventional bicycle clipless pedal has some problems such as a complex adjusted structure, a complex adjusted process, and a time-consuming so that the users are hard to accept.

Thereby, it is desirable to provide an adjustable pedal that is simple in structure and quick to adjust to meet the needs of each rider.

The present invention is, therefore, arisen to obviate or at least mitigate the above mentioned disadvantages.

SUMMARY OF THE INVENTION

An object of the present invention is to provide an adjusted pedal, which has simple and lightweight structure, and is quick to adjust a distance between a pedal body and crank.

To achieve the above and other objects, an adjusted pedal is provided, including a pedal body, having two clamp portions respectively configured to engage with a shoe; a pedal shaft, defining an axial direction; an engaging portion, disposed on the pedal body and movably engaged with the pedal shaft so that the pedal body is slidable positionly to the pedal shaft along the axial direction; wherein when the engaging portion is disengaged with the pedal shaft, the pedal body is slidable to the pedal shaft along the axial direction.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
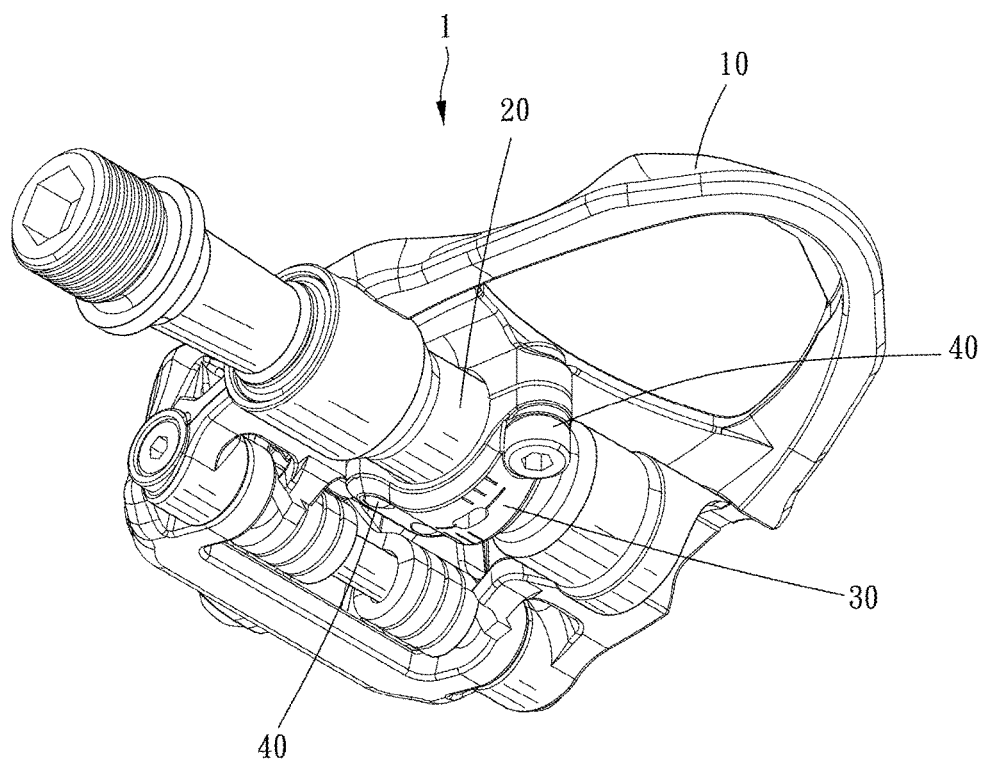
FIG. 1 is a perspective view of a preferable embodiment of the present invention.
Figure 2:
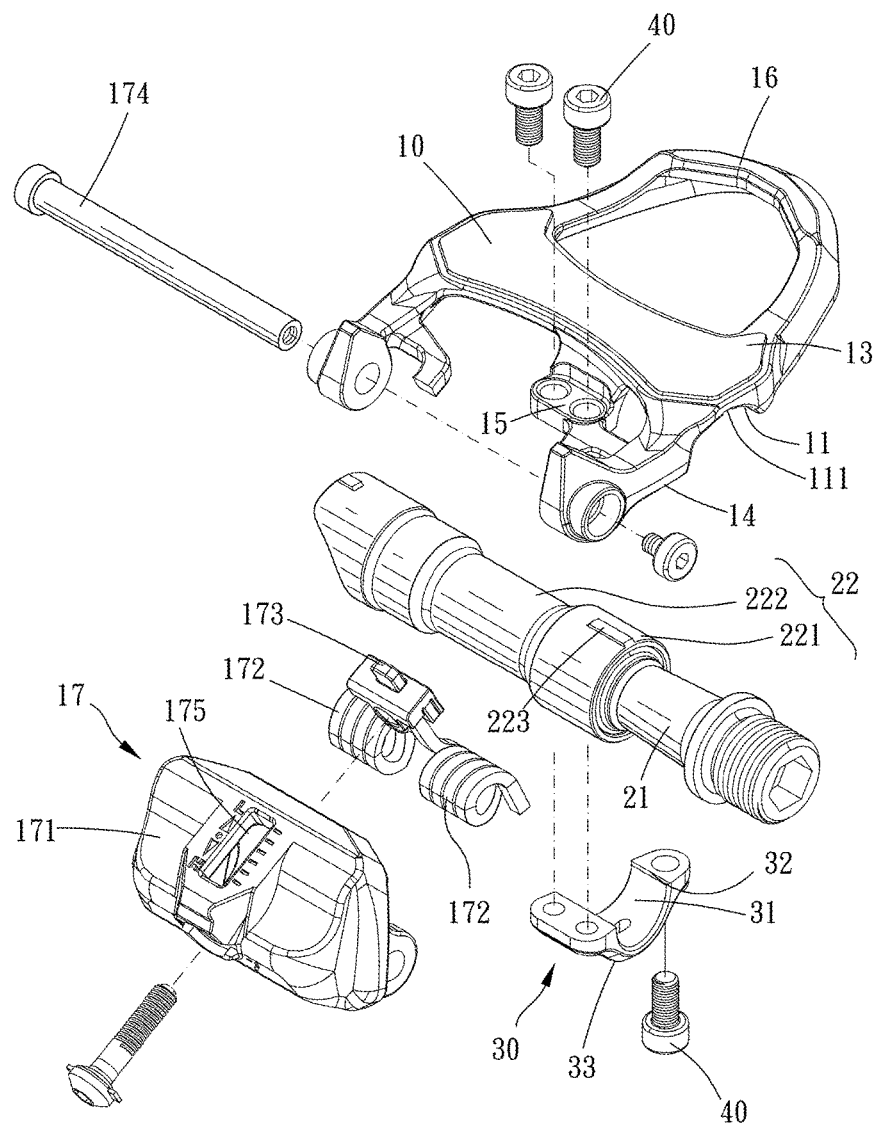
FIG. 2 is breakdown drawing of the preferable embodiment of the present invention.
Figure 3:
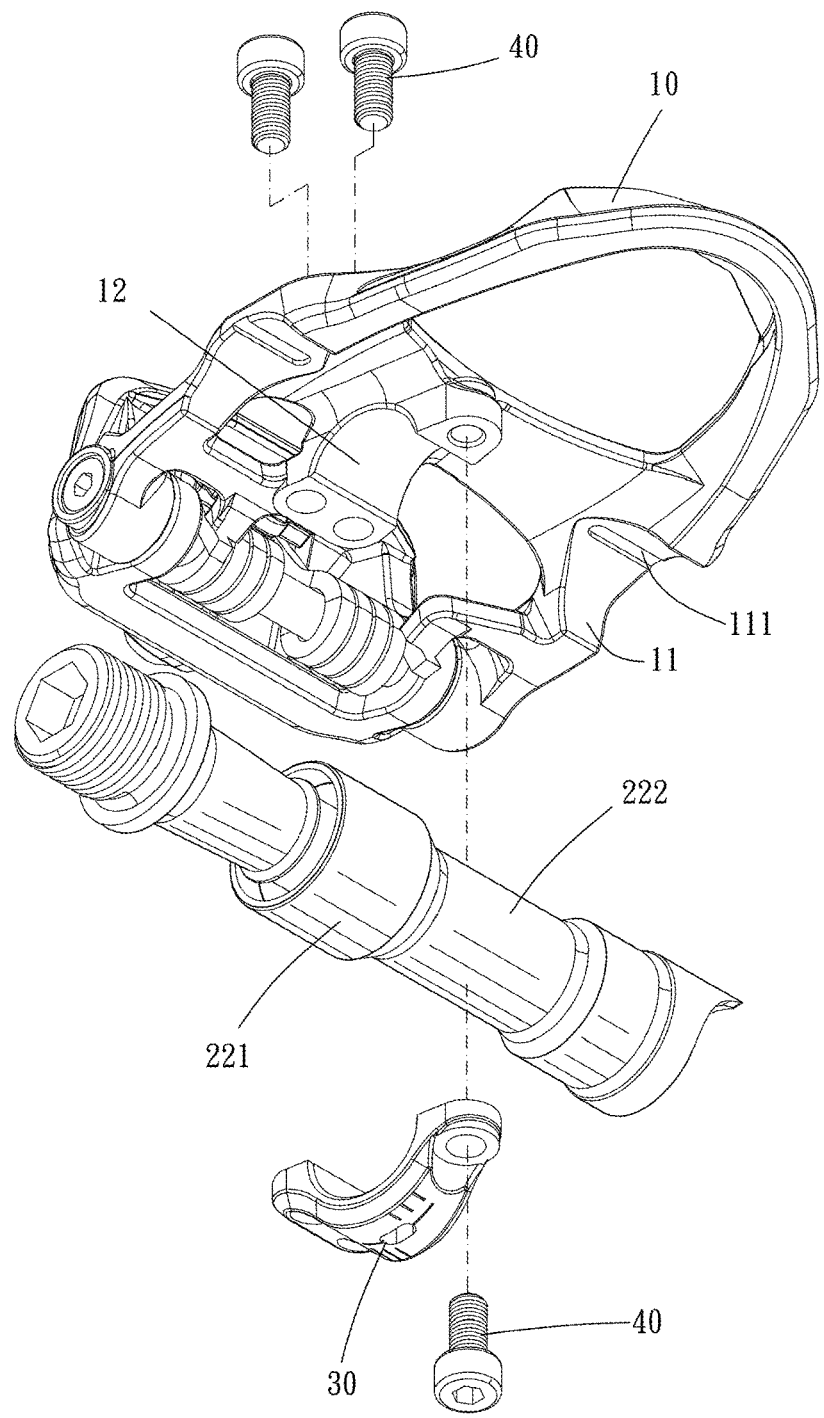
FIG. 3 is another breakdown drawing of the preferable embodiment of the present invention.

FIGS. 1 to 9 show an adjusted pedal according to a preferred embodiment of the present invention. The adjusted pedal 1 includes a pedal body 10, a pedal shaft 20 and an engaging portion 30.

The pedal body 10 has two clamp portions 16, 17 respectively configured to engage with a shoe. The pedal shaft 20 defines an axial direction, the pedal shaft 20 is configured to be assembled to a crank 2. The engaging portion 30 is disposed on the pedal body 10, and movably engaged with the pedal shaft 20 so that the pedal body 10 is slidable positionly to the pedal shaft 20 along the axial direction. The engaging portion 30 can be removably or unremovably connected with the pedal body 10. The engaging portion 30 and the pedal body 10 can be connected to each other through screw structures, male-female buckles, etc. Wherein when the engaging portion 30 is disengaged with the pedal shaft 20, no matter totally or partially release with respect to the pedal shaft 20, the pedal body 10 is slidable to the pedal shaft 20 along the axial direction. That is, the pedal body 10 is slidable to the pedal shaft 20 along the axial direction in a non-spiral way. In this embodiment, when the engaging portion 30 is disengaged the pedal shaft 20, the pedal body 10 is linearly shiftable relative to the pedal shaft 20 along the axial direction, so as to provide with a stepless movement. Therefore, the present invention is to provide a quick-adjustment of a position that the pedal body 10 relative to the pedal shaft 20. It is to be noted that, the engaging portion 30 can be abutted against or engaged with the pedal shaft 20 to secure on the pedal shaft 20. Furthermore, please refer to FIGS. 8 to 9, when the engaging portion 30 is released with respect to the pedal body 10, the pedal body 10 can be movable to the pedal shaft 20 along the axial direction, to change a distance between a center of the pedal body 10 and a center of the crank 2. Specifically, please refer to FIG. 8, a distance H1 between the center of the pedal body 10 and the center of the crank 2 is greater than a distance H2 between the center of the pedal body 10 and the center of the crank 2 in FIG. 9, so as to meet variety foot widths of different users.

Specifically, the pedal shaft 20 further includes a spindle 21 and a rotatable sleeve 22 rotatably sleeved on the spindle 21. The pedal body 10 is slidably connected with the rotatable sleeve 22 along the axial direction and rotatable with respect to the spindle 21 accompanying the rotatable sleeve 22, and the engaging portion 30 is movably engaged with the rotatable sleeve 22 so that the pedal body 10 can be rotated with respect to the spindle 21. Preferably, the rotatable sleeve 22 includes at least one large diameter section 221 and a small diameter section 222 connected with the at least one large diameter section 221, and the engaging portion 30 is movably engaged with the small diameter section 222 and stopped by the at least one large diameter section 221, so as to limit a movement range of the pedal body 10. In this embodiment, the pedal body 10 is releasably connected with the rotatable sleeve 22, so as to change different type of the pedal bodies and to connect the pedal body 10 to the rotatable sleeve 22 easily. For example, a pedal of a road bike and a pedal of a mountain bike can be quick exchanged and quick-connected with the rotatable sleeve 22.

The pedal body 10 has two recesses 11 which are respectively corresponded to the rotatable sleeve 22 in shape. At least one of each of the two recesses 11 and the rotatable sleeve 22 has a convex portion, the other of each of the two recesses 11 and the rotatable sleeve 22 has a groove portion engaged with the convex portion. In this embodiment, each of the two recesses 11 has a groove portion 111, the rotatable sleeve 22 has a convex portion 223, the convex portion 223 and the groove portion 111 are respectively linearly extending in the axial direction, so as to rotate the pedal body 10 accompanying the rotatable sleeve 22 in a simple structure, and to restrict the movement that the pedal body 10 can only move with respect to the pedal shaft 20 in a linear direction.

The pedal shaft 20 is secured between the pedal body 10 and the engaging portion 30, and the engaging portion 30 is movable to the pedal body 10 along a direction which is transverse to the axial direction to optionally secure the pedal shaft 20 between the pedal body 10 and the engaging portion 30, so as to provide with a strong secure ability.

The engaging portion 30 has an arc recess 31, the arc recess 31 has an opening 32, a diameter of the opening 32 is greater than half a diameter of the pedal shaft 20, and the pedal shaft 20 is a round rod, and part of the round rod is received in the arc recess 31. Preferably, the pedal body 10 further includes an arc recess 12 corresponding to the round rod in shape, another part of the round rod is received in the arc recess 12 of the pedal body 10, so as to abut against the pedal shaft 20 firmly and enhance the clamping force. Moreover, the pedal body 10 can be moved relative to the pedal shaft 20 smoothly when the engaging portion 30 is disengaged with the pedal shaft 20. Besides, the engaging portion 30 has an arc curved elastic section 33 defining the arc recess 31. The arc curved elastic section 33 has a groove structure 34. The groove structure 34 includes a plurality of first grooves 341 extending toward a length direction of the arc curved elastic section 33, and a plurality of second grooves 342 extending toward a width direction of the arc curved elastic section 33, so as to improve a bending degree to avoid being damaged and broken by outer force. The arc curved elastic section 33 has a through hole 343 penetrating through along a thickness direction thereof. Besides, a rear end and an front end of the pedal shaft 20 which is the round rod are respectively abutted against the recess 11 of the pedal body 10 and the arc recess 12 of the pedal body 10 so that the pedal body 10 can support the foot stably when pedaling.

Preferably, the engaging portion 30 and the pedal body 10 are connected to each other through at least two connection members 40 which are respectively disposed therethrough from two opposite sides of the pedal body 10. In this embodiment, each of the two connection members 40 is a screw, so as to enhance the clamping force of clamping the pedal shaft 20 through two forces in two opposite directions. More specifically, the present invention can release the engaging portion 30 from an abutting state by slightly loosening the connection member 40 which is disposed on a bottom portion of the pedal body 10. Therefore, the pedal body 10 can be moved with respect to the pedal shaft 20 to the suitable position for pedaling. Besides, the present invention is connected the pedal body 10 to the pedal shaft 20 through a design of an abutting structure; in this embodiment, the abutting structure is the engaging portion 30. It can assemble and dissemble the engaging portion 30 to the pedal body 10 quickly and easily. More specially, the bottom portion of the pedal body 10 which is corresponding to the pedal shaft 20, not only includes the recess 11 and the arc recess 12 which are respectively produced by a turn-milling process, but also includes a hollow section which is between the recess 11 and the arc recess 12 and produced by the turn-milling process in large area, so as to have the adjusted pedal with lightweight.

Figure 4:
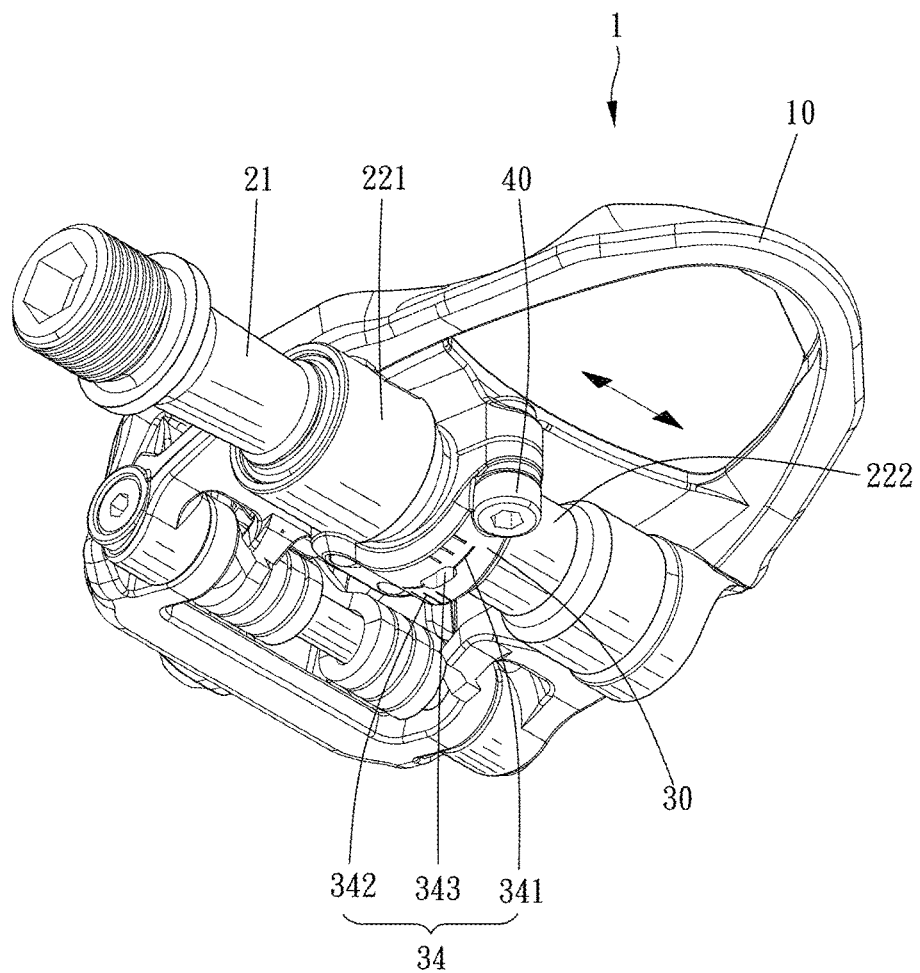
FIG. 4 is a movement view showing a pedal body movement of the preferable embodiment of the present invention.
Figure 5:
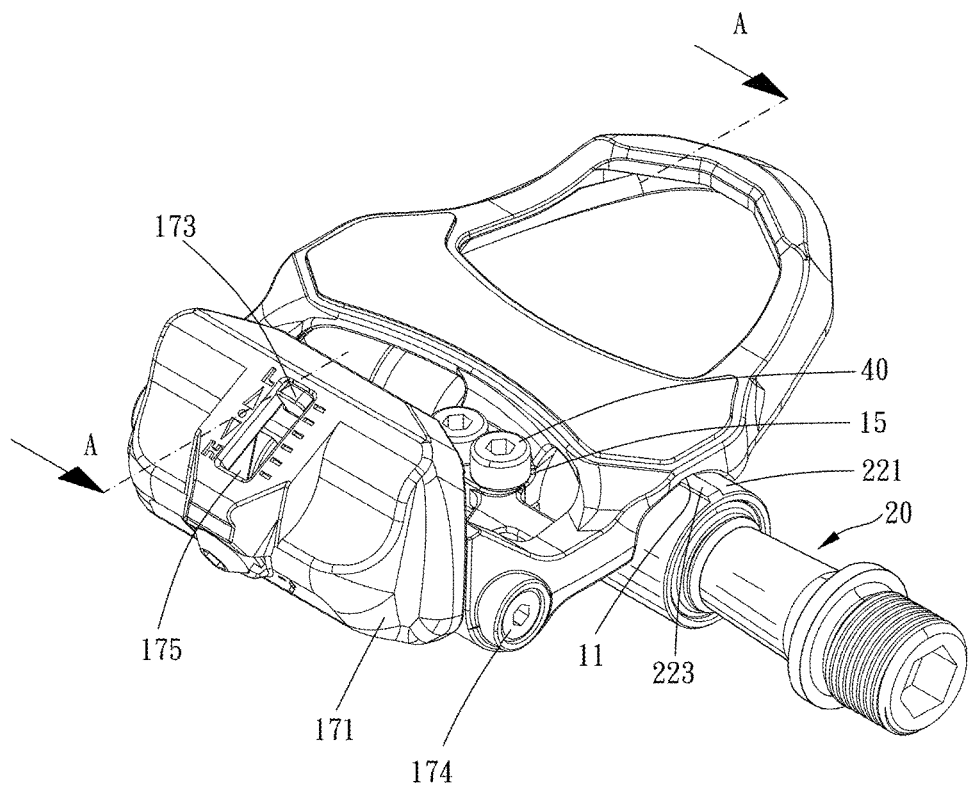
FIG. 5 is another perspective view of the preferable embodiment of the present invention.
Figure 6:
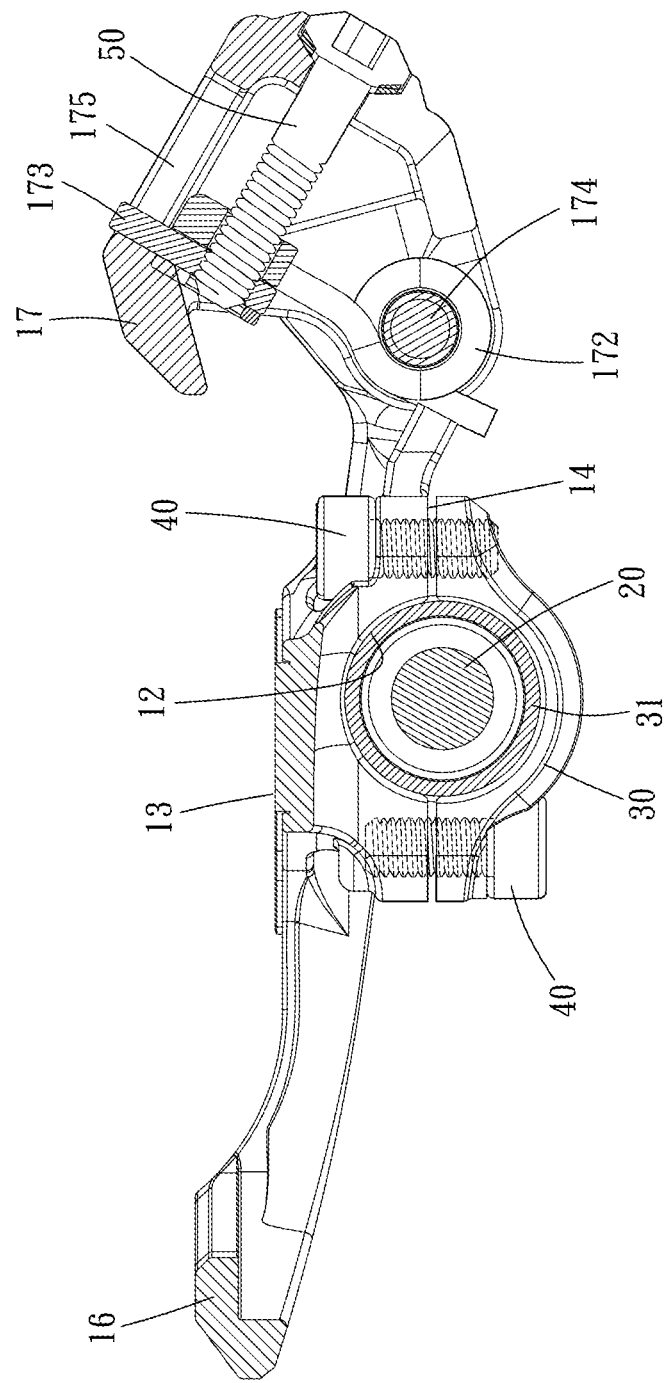
FIG. 6 is a cross-sectional view taken on line A-A of FIG. 5.
Figure 7:
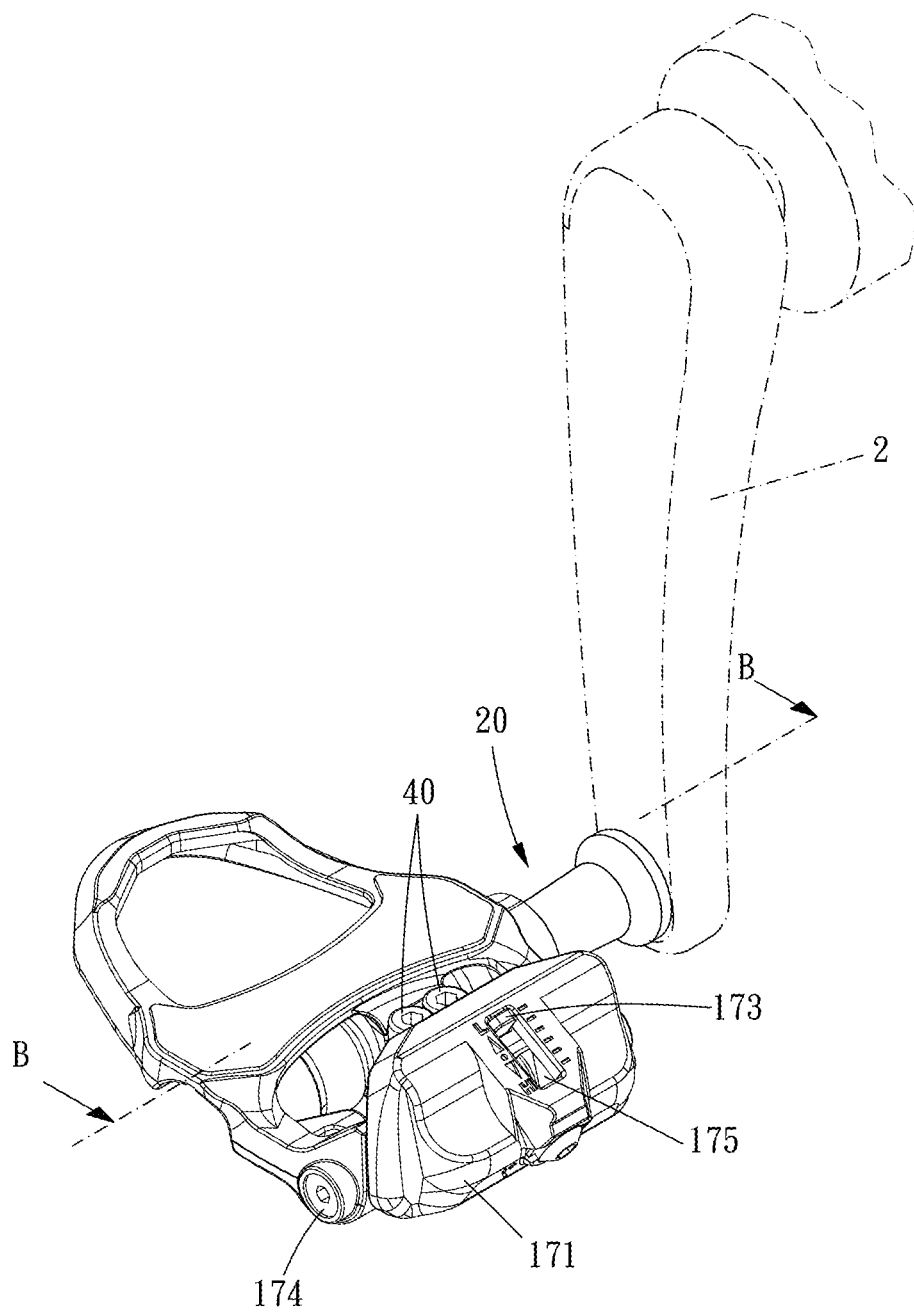
FIG. 7 is a perspective view of an adjusted pedal of the present invention configured to a crank.
Figure 8:
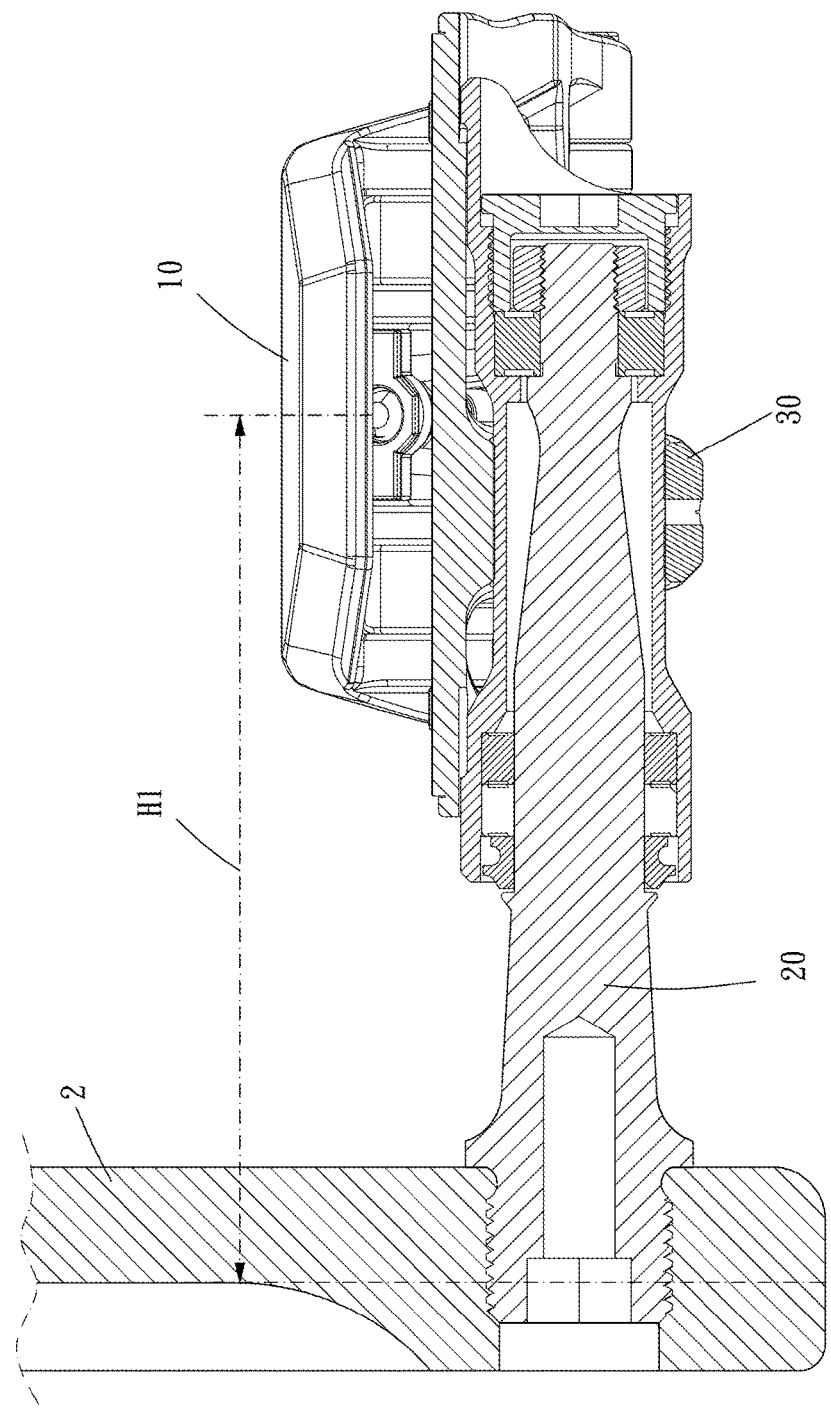
FIGS. 8-9 are cross-sectional views taken on line B-B of FIG. 7 in use.
Figure 9:
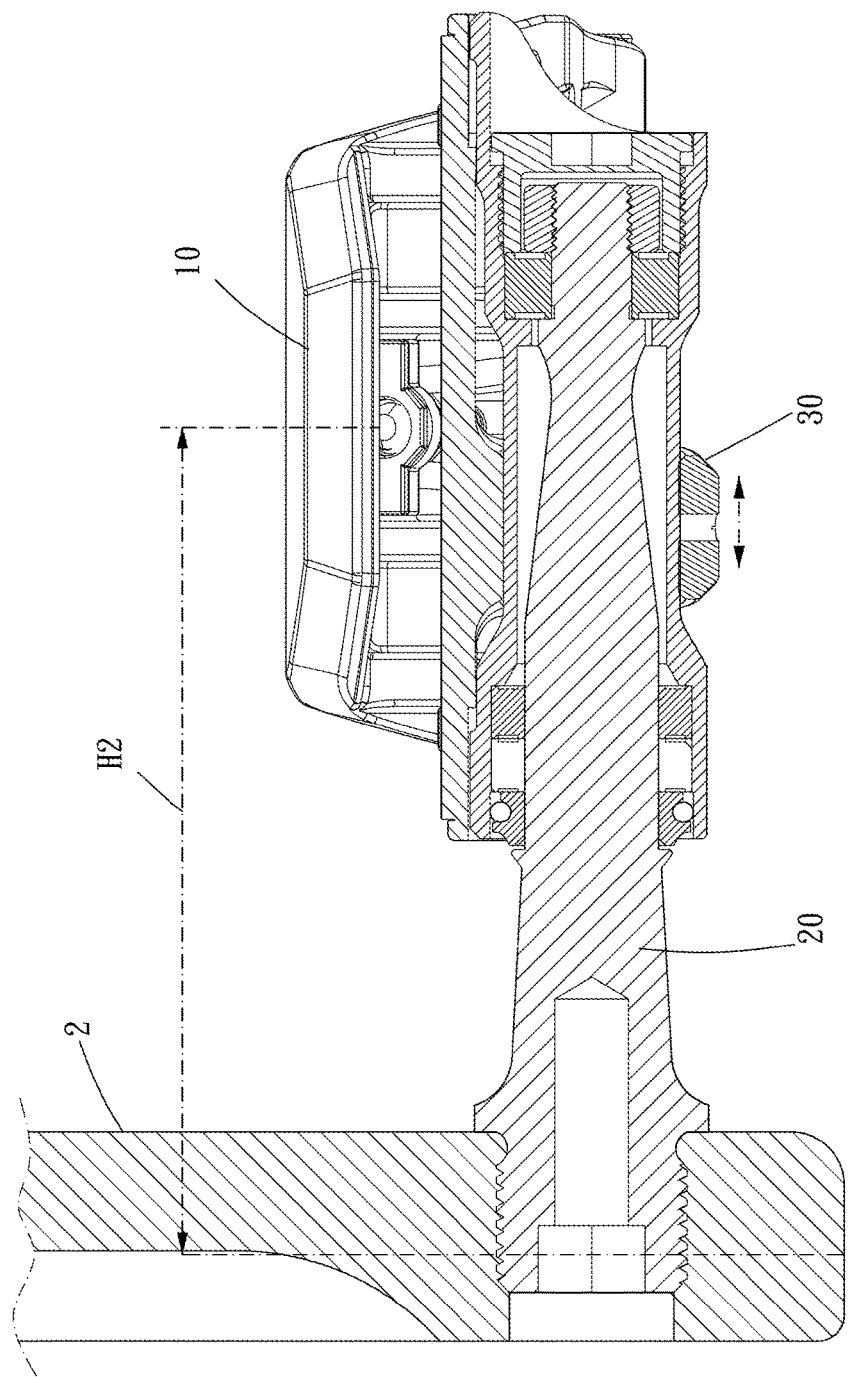

Preferably, as shown in FIGS. 4 and 6, at least one connection member 40 is disposed on the bottom portion of the pedal body 10. Therefore, a connection hole such as a hexagonal connection hole of each one connection member 40, which can be connected with a removing tool (not shown) is not easy to accumulate sand therein, so as to achieve a quick-adjustment of the connection member 40. Specifically, the pedal body 10 has a top face 13, a bottom face 14 and a connection convex 15 extending laterally therefrom, the top face 13 is adapted for being disposed the shoe to pedal. The engaging portion 30 is disposed on the bottom face 14, a location of the connection convex 15 is lower than the top face 13, and at least one of the at least two connection members 40 is disposed through the connection convex 15 and the engaging portion 30, so as to avoid pedaling the engaging portion 30 directly. Thus, the connection member 40 can connect with the engaging portion 30 tightly when pedaling.

Specifically, one of the two clamp portions 16, 17 is a rear hook portion 17 which is movable to the pedal body 10. The rear hook portion 17 includes a hook body 171, at least one torsion spring 172 and an adjusting member 173. The hook body 171 has a pivot rod 174 disposed through the pedal body 10 and a position-limiting portion 175. Each of the at least one torsion spring 172 sleeves on the pivot rod 174, the at least one torsion spring 172 abuts resiliently against between the pedal body 10 and the adjusting member 173, and the adjusting member 173 is movably positionally disposed to the position-limiting portion 175. In this embodiment, the position-limiting portion 175 is a position-limiting hole, and the adjusting member 173 is disposed within the position-limiting hole. In this embodiment, the hook body 171 and the adjusting member 173 are connected to each other through a screw member 50, so as to screw the screw member 50 to move the adjusting member 173 with respect to the position-limiting portion 175 to adjust a torque value of each torsion spring 172.

Given the above, the adjusted pedal of the present invention, can release the engaging portion from an abutting state by slightly loosening the connection member from the pedal body without removing the connection member from the pedal body, so as to quick-move the pedal body with respect to the pedal shaft to the suitable position for pedaling. And the adjusted pedal of the present invention is connected the pedal body to the pedal shaft through a design of an abutting structure, in this embodiment, the abutting structure is the engaging portion, so as to assemble and dissemble the engaging portion to the pedal body quickly and easily, and to achieve an advantage of exchanging between the pedal body of mountain bike and the pedal body of the road bike. Thus, the users can choose the pedal body of mountain bike or the pedal body of the road bike to quick-connect to the pedal shaft according to need. Moreover, the simple structure of engaging portion for quick-assembling and quick-disassembling can provide advantages of a quick and easy adjustment, and also a lightweight structure.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An adjusted pedal, including:
    a pedal body, having two clamp portions respectively configured to engage with a shoe;
    a pedal shaft, defining an axial direction;
    an engaging portion, connected to the pedal body and releasably engaged with the pedal shaft so that the pedal body is adjustably positioned on the pedal shaft along the axial direction;
    wherein the pedal shaft is secured between the pedal body and the engaging portion, and the engaging portion is movable to the pedal body along a direction which is transverse to the axial direction to optionally secure and release the pedal shaft between the pedal body and the engaging portion.

2. The adjusted pedal of claim 1, wherein the pedal shaft further includes a spindle and a rotatable sleeve rotatably sleeved on the spindle, the pedal body is slidably connected with the rotatable sleeve along the axial direction and rotatable with respect to the spindle accompanying the rotatable sleeve, and the engaging portion is movably engaged with the rotatable sleeve.

3. The adjusted pedal of claim 2, wherein the pedal body is releasably connected with the rotatable sleeve.

4. The adjusted pedal of claim 2, wherein the rotatable sleeve includes at least one large diameter section and a small diameter section connected with the at least one large diameter section, and the engaging portion is movably engaged with the small diameter section and stopped by the at least one large diameter section.

5. The adjusted pedal of claim 4, wherein the pedal body is releasably connected with the rotatable sleeve; the pedal body has two recesses which are respectively corresponded to the rotatable sleeve in shape, one of each of the two recesses and the rotatable sleeve has a convex portion, the other of each of the two recesses and the rotatable sleeve has a groove portion engaged with the convex portion, the convex portion and the groove portion respectively linearly extending in the axial direction; the engaging portion and the pedal body are connected to each other through at least two connection members which are respectively disposed therethrough from two opposite sides of the pedal body; the pedal body has a top face, a bottom face and a connection convex extending laterally therefrom, the engaging portion is disposed on the bottom face, a location of the connection convex is lower than the top face, and at least one of the at least two connection members is disposed through the connection convex and the engaging portion; the engaging portion has an arc recess, the arc recess has an opening, a diameter of the opening is greater than half a diameter of the pedal shaft, and the pedal shaft is a round rod, and part of the round rod is received in the arc recess; the pedal body further includes an arc groove corresponding to the round rod in shape, another part of the round rod is received in the arc groove of the pedal body; the engaging portion has an arc curved elastic section defining the arc recess, the arc curved elastic section has a groove structure; the groove structure includes a plurality of first grooves extending toward a length direction of the arc curved elastic section, and a plurality of second grooves extending toward a width direction of the arc curved elastic section; and the arc curved elastic section has a through hole penetrating through along a thickness direction thereof.

6. The adjusted pedal of claim 1, wherein the engaging portion and the pedal body are connected to each other through at least two connection members which are respectively disposed therethrough from two opposite sides of the pedal body.

7. The adjusted pedal of claim 6, wherein the pedal body has a top face, a bottom face and a connection convex extending laterally therefrom, the engaging portion is disposed on the bottom face, a location of the connection convex is lower than the top face, and at least one of the at least two connection members is disposed through the connection convex and the engaging portion.

8. The adjusted pedal of claim 1, wherein the engaging portion has an arc recess, the arc recess has an opening, a diameter of the opening is greater than half a diameter of the pedal shaft, and the pedal shaft is a round rod, and part of the round rod is received in the arc recess.

9. The adjusted pedal of claim 1, wherein one of the two clamp portions is a rear hook portion which is movable to the pedal body, the rear hook portion includes a hook body, at least one torsion spring and an adjusting member, the hook body has a pivot rod disposed through the pedal body and a position-limiting portion, each of the at least one torsion spring sleeves on the pivot rod, the at least one torsion spring is disposed between the pedal body and the adjusting member, and the adjusting member is disposed to the position-limiting portion.

* * * * *